United States Patent
Kim et al.

(10) Patent No.: US 9,638,970 B2
(45) Date of Patent: May 2, 2017

(54) LIQUID CRYSTAL DISPLAY AND METHOD OF MANUFACTURING THE SAME

(71) Applicant: Samsung Display Co., Ltd., Yongin-si, Gyeonggi-do (KR)

(72) Inventors: Swae-Hyun Kim, Asan-si (KR); Eun-Kil Park, Cheonan-si (KR); Hyun-Ho Kang, Ansan-si (KR); Ki Kyung Youk, Bucheon-si (KR); Sang Woo Whangbo, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 9 days.

(21) Appl. No.: 14/847,107

(22) Filed: Sep. 8, 2015

(65) Prior Publication Data

US 2016/0246100 A1    Aug. 25, 2016

(30) Foreign Application Priority Data

Feb. 25, 2015 (KR) ......................... 10-2015-0026650

(51) Int. Cl.
*G02F 1/1362* (2006.01)
*G02F 1/1333* (2006.01)
*G02F 1/1339* (2006.01)

(52) U.S. Cl.
CPC ................. *G02F 1/136209* (2013.01); *G02F 2001/13398* (2013.01); *G02F 2001/133388* (2013.01);
(Continued)

(58) Field of Classification Search
CPC ........... G02F 1/133512; G02F 1/13394; G02F 1/133514; G02F 1/1339; G02F 1/136209; G02F 1/1368; G02F 1/1362; G02F 1/136227; G02F 1/136213; G02F 1/136286; G02F 1/1333; G02F 1/133345; G02F 1/133711; G02F 1/1343; G02F 1/134309; G02F 1/136; G02F 1/1335; G02F 1/1337;
(Continued)

(56) References Cited

U.S. PATENT DOCUMENTS 7,884,900 B2    2/2011 Doi et al.
8,284,353 B2 * 10/2012 Huang .................. G02F 1/1343
                                                            345/104

(Continued)

FOREIGN PATENT DOCUMENTS

| KR | 1020080003108 A | 1/2008 |
| KR | 10-1013987 B1 | 2/2011 |
| KR | 1020120088220 A | 8/2012 |
| KR | 10-1331901 B1 | 11/2013 |
| KR | 1020130137457 A | 12/2013 |

*Primary Examiner* — Thoi Duong
(74) *Attorney, Agent, or Firm* — Cantor Colburn LLP

(57) ABSTRACT

A liquid crystal display includes: a substrate including a display region and a non-display region, the non-display region including a first region adjacent to the display region and a second region further from the display region than the first region; a light blocking member disposed in the non-display region of the substrate; and a plurality of step providing layers disposed between the substrate and the light blocking member in the non-display region of the substrate, the step providing layers spaced apart from each other. A height of the light blocking member disposed in the first region of the non-display region is different from a height of the light blocking member disposed in the second region of the non-display region.

12 Claims, 9 Drawing Sheets

(52) U.S. Cl.
CPC ............ *G02F 2001/136222* (2013.01); *G02F 2201/50* (2013.01)

(58) Field of Classification Search
CPC .......... G02F 2001/133388; G02F 2001/13396;
G02F 2001/136222; H01L 51/5284;
H01L 27/3244; H01L 27/322; H01L
27/3211; H01L 27/3246; H01L 27/3277;
H01L 29/78633; H01L 29/78678; H01L
31/02164
USPC ... 349/106, 110, 153, 155, 123, 43, 156, 38,
349/122, 152, 158, 190, 42, 157, 149;
257/72, E21.243, E21.411, E21.499
See application file for complete search history.

(56) References Cited

U.S. PATENT DOCUMENTS

| | | | |
|---|---|---|---|
| 2005/0147899 A1* | 7/2005 | Sun | G02B 5/22 430/7 |
| 2013/0271704 A1 | 10/2013 | Zhao et al. | |
| 2013/0292680 A1 | 11/2013 | Kim | |
| 2013/0308079 A1 | 11/2013 | Chen | |
| 2013/0321750 A1 | 12/2013 | Wu | |

* cited by examiner

LIQUID CRYSTAL DISPLAY AND METHOD OF MANUFACTURING THE SAME

This application claims priority to Korean Patent Application No. 10-2015-0026650 filed on Feb. 25, 2015, and all the benefits accruing therefrom under 35 U.S.C. §119, the content of which in its entirety is herein incorporated by reference.

BACKGROUND (a) Field

This disclosure relates to a liquid crystal display and a method of manufacturing the same.

(b) Description of the Related Art

A liquid crystal display ("LCD") is one among flat panel displays ("FPD") which are most widely used. The LCD includes two display panels on which electric field generating electrodes are disposed, and a liquid crystal layer interposed therebetween. A voltage is applied to the field generating electrodes to generate an electric field in the liquid crystal layer for rearranging the orientation of liquid crystal material in the liquid crystal layer, and thereby controlling amount of light passing through the liquid crystal display to display an image.

A LCD may have a structure in which each of the electric field generating electrodes is disposed in a respective one of the two display panels. For instance, one display panel (hereinafter referred to as a "thin film display panel") includes a plurality of pixel electrodes and thin film transistors which are arranged in matrix shape, and the other display panel (hereinafter referred to as a "common electrode display panel") includes color filters of red, green and blue and a common electrode covering the entire surface thereof.

However, when the pixel electrodes and the color filters are disposed in different display panels, correctly aligning the pixel electrodes and the color filters with each other may be difficult, which may cause an alignment error. To solve this problem, a color filter on array ("COA") structure may be used in which the pixel electrodes and the color filters are disposed in the same display panel.

Also, when a light blocking member is disposed in the common electrode display panel, considering an error margin of assembling the thin film transistor display panel and the common electrode display panel with each other, the light blocking member such as a black matrix may be disposed to have some surplus area. However, such surplus area of the black matrix reduces the aperture ratio of the display device. Therefore, to avoid reduction of the aperture ratio, the black matrix may alternatively be disposed in the thin film transistor display panel in which the pixel electrodes and the color filters are disposed.

SUMMARY

One or more exemplary embodiment of the invention provides a liquid crystal display including a light blocking member in a non-display region of the liquid crystal display, where the light blocking member is simultaneously formed with a spacer and sufficiently prevents light leakage.

One or more exemplary embodiment of the invention provides a method of manufacturing a liquid crystal display, in which an overflow or curl of liquid crystal material is reduced or effectively prevented by suppressing flowability of the liquid crystal material.

An exemplary embodiment of the invention provides a liquid crystal display including: a substrate including a display region and a non-display region, the non-display region including a first region adjacent to the display region and a second region further from the display region than the first region; a light blocking member disposed in the non-display region of the substrate; and a plurality of step providing layers disposed between the substrate and the light blocking member in the non-display region of the substrate, the step providing layers spaced apart from each other. A height of the light blocking member disposed in the first region of the non-display region is different from a height of the light blocking member disposed in the second region of the non-display region.

The height of the first light blocking member disposed in the first region may be smaller than the height of the second light blocking member disposed in the second region by about 0.5 micrometer (um) or more.

A width of the first region may be equal to or greater than about 16% of a total width of the non-display region.

A width of the first region taken from the display region may be about 800 um.

The liquid crystal display may further include the color filter disposed in the display region of the substrate, and the step providing layers disposed in the first region may include a same material as the color filter disposed in the display region.

The color filter in the display region may include a blue color filter, and the step providing layers disposed in the first region may include a same material as the blue color filter.

The step providing layers in the non-display region may include a first step providing layer disposed in the first region of the non-display region, and the first step providing layer disposed in the first region is elongated in a length direction of the first region.

In a width direction of the first region, the first step providing layer may include protrusions and depressions alternately arranged.

The liquid crystal display may further include a light leakage preventing layer between the first step providing layer disposed in the first region of the non-display region and the substrate, and in a width direction of the first region, the light leakage preventing layer may include a plurality of portions spaced apart from each other.

The light leakage preventing layer may include a metal slit pattern.

In the width direction of the first region, an interval between adjacent patterns of the metal slit pattern may be equal to or less than about 5 um.

According to an embodiment of the invention, a method for manufacturing a liquid crystal display includes preparing a substrate including a display region and a non-display region, the non-display region including a first region adjacent to the display region and a second region further from the display region than the first region; forming a plurality of step providing layers spaced apart from each other in the non-display region; forming a light blocking member material in the first and second regions of the non-display region and on the plurality of step providing layers spaced apart from each other in the non-display region; and exposing the light blocking member material disposed in the first region to an exposure light through a mask including a half-tone pattern which partially transmits the exposure light to form a light blocking member of which a height thereof in the first region of the non-display region is different from a height thereof in the second region of the non-display region.

The method may further include, before the forming the plurality of step providing layers spaced apart from each other in the non-display region, forming a plurality of light leakage preventing layers which is spaced apart from each other in the first region.

The half-tone pattern may transmit from about 15% to about 20% of the exposure light.

The mask may further include a full-tone pattern which fully transmits the exposure light, and the method may further include exposing the light blocking member material disposed in the second region to the exposure light through the full-tone pattern to form the light blocking member of which the height thereof in the first region of the non-display region is different from the height thereof in the second region of the non-display region.

The method of manufacturing the liquid crystal display according to an embodiment of the invention may include preparing a substrate including a display region and a non-display region, the non-display region including a first region adjacent to the display region and a second region further from the display region than the first region; forming a gate insulating layer in the non-display region of the substrate; forming a step providing layer material on the gate insulating layer in the first region; patterning the step providing layer material on the gate insulating layer in the first region by etching to form a step providing layer in the first region; forming a light blocking member material in the first and second regions of the non-display region and on the step providing layer in the first region; and exposing the light blocking member material disposed on the step providing layer in the first region to an exposure light through a half-tone pattern which partially transmits the exposure light and exposing the light blocking member material disposed in the second region to the exposure light through a full-tone pattern which fully transmits the exposure light to form a light blocking member of which a height thereof in the first region of the non-display region is different from a height thereof in the second region of the non-display region.

The liquid crystal display according to one or more exemplary embodiment of the invention may reduce or effectively prevent defects of an inflated display region cell gap or over-etching the light blocking member disposed in the display region.

Also, the liquid crystal display according to one or more exemplary embodiment of the invention may reduce or effectively prevent the overflow and curl of liquid crystal material disposed in the by suppressing flowability of the liquid crystal material.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
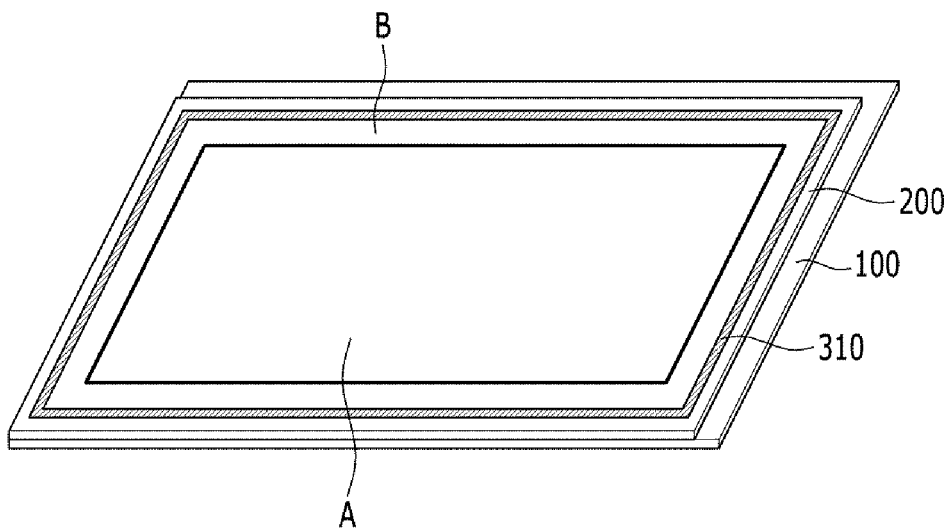
FIG. 1 is a perspective view of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" and "upper" may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A thickness of the liquid crystal layer between two display panels of a liquid crystal display ("LCD") device is referred to as a cell gap, and the cell gap has an influence on general operation characteristics of the LCD such as response speed, contrast ratio, viewing angle and luminance uniformity. If the cell gap is not uniform, an image may be distorted at some region of the viewable display screen of the LCD, which may deteriorate the display quality of the LCD. Accordingly, a plurality of spacers is disposed in one of the two display panels to maintain the uniform cell gap throughout the entire region of the display screen.

A light blocking member such as including a black matrix reduces or effectively prevents light leakage at the boundary region of the pixels and at a non-display region at the circumference of a display region of the LCD. In manufacturing the LCD, the spacers and the light blocking member may be simultaneously formed to simplify a manufacturing process. However, when a height of the spacer is relatively low, simultaneously forming the light blocking member with sufficient optical density to reduce light leakage in the non-display region may be difficult.

In manufacturing the LCD, the liquid crystal layer is formed by injecting liquid crystal material between the two display panels at display regions thereof. However, the liquid crystal material may overflow over the display region or be curled into the display region. Where the liquid crystal material overflows over the display region or is curled into the display region, the liquid crystal material is not uniformly dispersed between the two display panels but concentrates on a portion, thereby causing non-uniformity of the cell gap.

Hereinafter, an exemplary embodiment of a LCD according to the invention will be described in detail with reference to FIG. 1 to FIG. 4.

Figure 2:
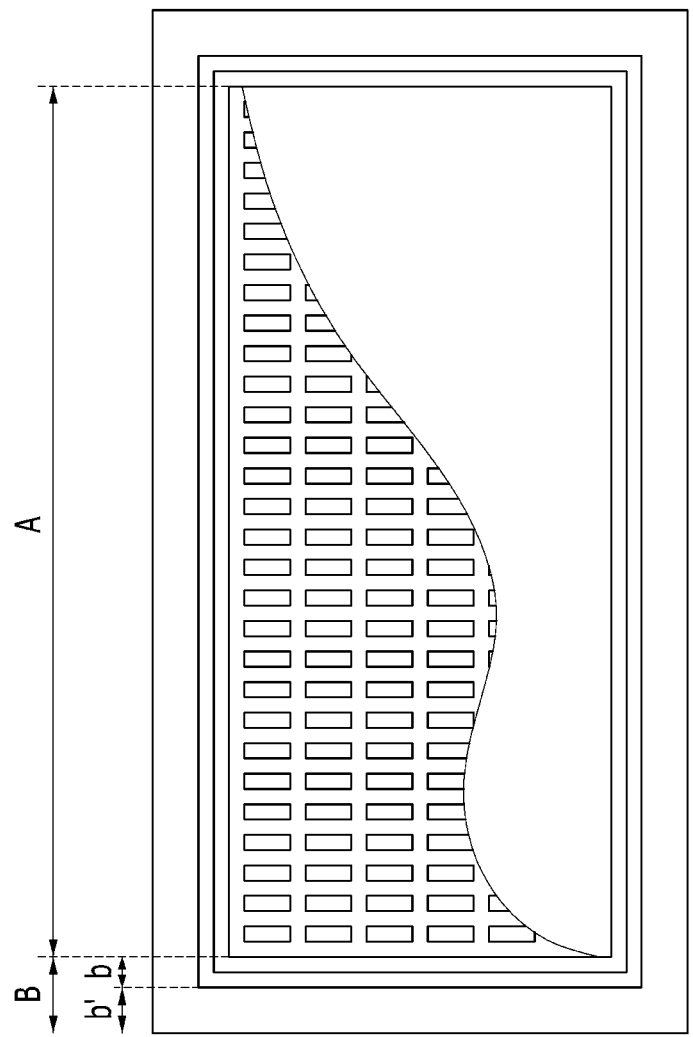
FIG. 2 is a top plan view of an exemplary embodiment of a color filter substrate of the liquid crystal display according to the invention.
Figure 3:
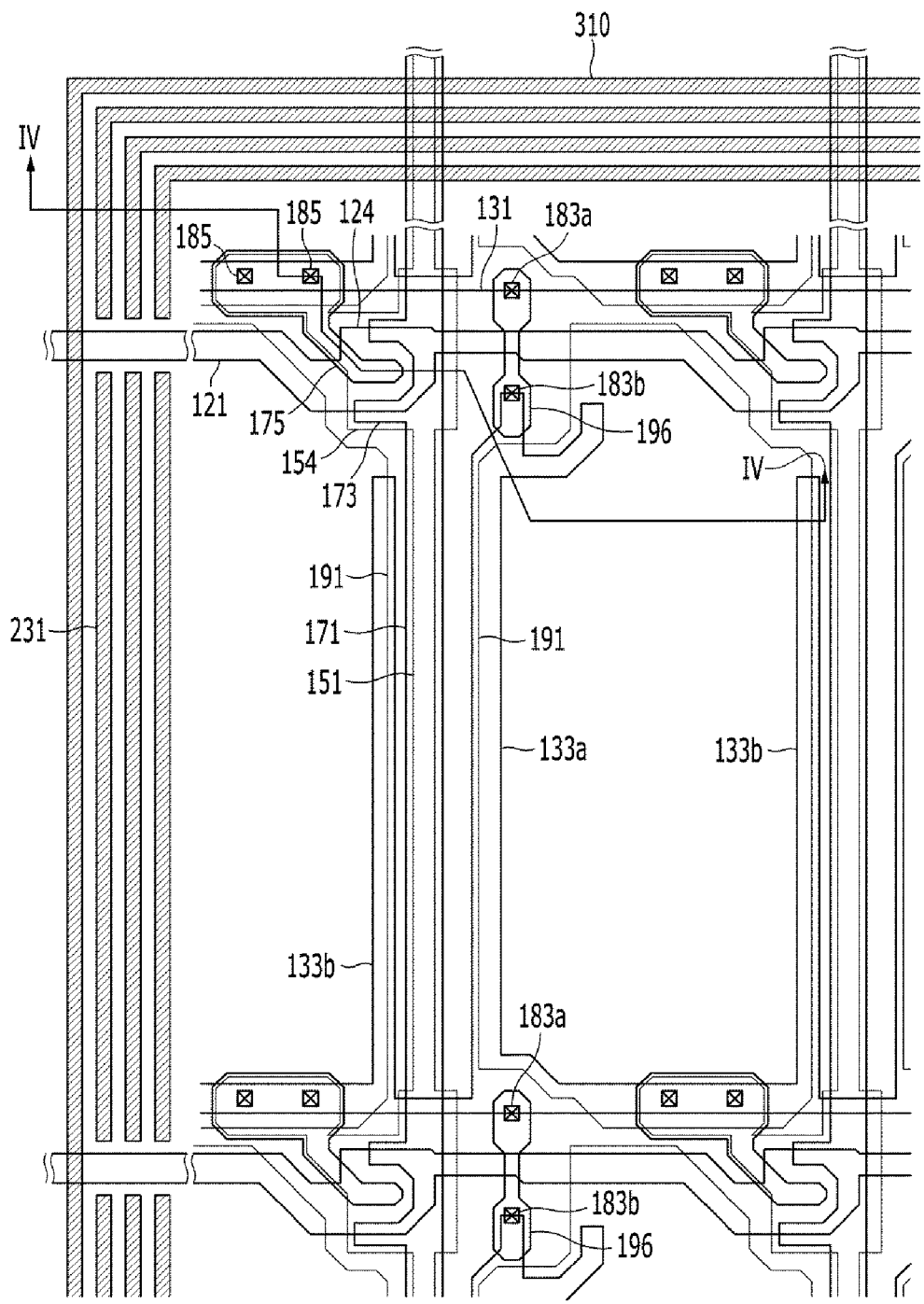
FIG. 3 is a top plan view showing an exemplary embodiment of a portion of the liquid crystal display of FIG. 1.
Figure 4:
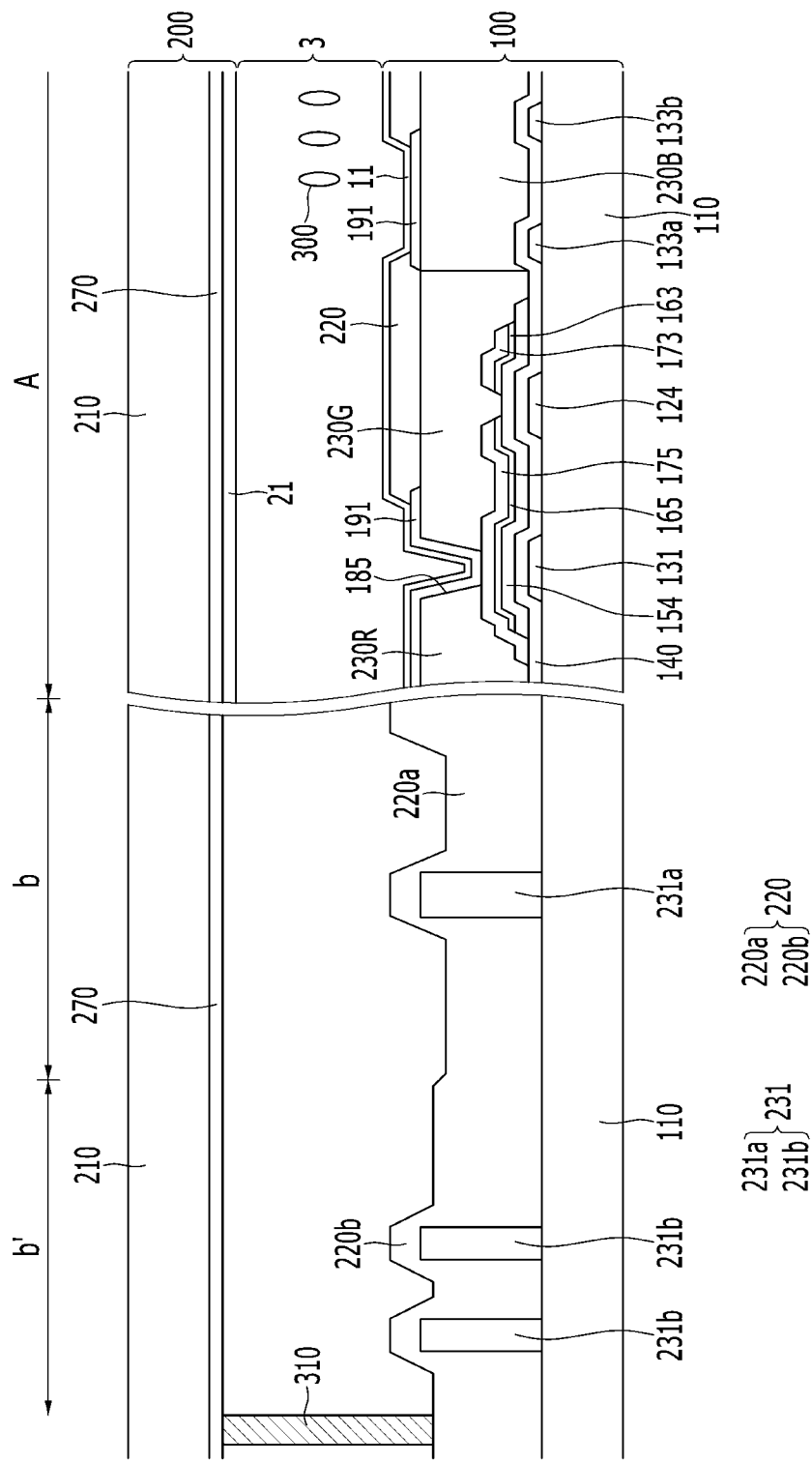
FIG. 4 is a cross-sectional view taken along line IV-IV of the liquid crystal display of FIG. 3.

FIG. 1 is a perspective view of an exemplary embodiment of a LCD according to the invention, and FIG. 2 is a top plan view of an exemplary embodiment of a color filter substrate of the LCD according to the invention. Also, FIG. 3 is a top plan view showing an exemplary embodiment of a portion of the LCD of FIG. 1, and FIG. 4 is a cross-sectional view taken along line IV-IV of the LCD of FIG. 3.

Referring to FIG. 1 to FIG. 4, the LCD includes a thin film transistor display panel 100, a common electrode display panel 200, and a liquid crystal layer 3 interposed between the two display panels 100 and 200. The LCD includes a display region A in which an image is displayed and a non-display region B at which an external driving circuit is connected and in which an image is not displayed.

At first, the display region A of the thin film transistor display panel 100 will be described. A plurality of pixel areas may be defined in the display region A of the LCD.

A plurality of gate lines 121 and a plurality of storage electrode lines 131 are disposed on a substrate 110 which includes or is made of an insulating material such as a transparent glass, plastic or the like.

The gate lines 121 transfer a gate signal and are mainly extended to be elongated in a horizontal direction in the top plan view. Each of the gate lines 121 includes a plurality of gate electrodes 124 which protrude from a main portion of the gate line 121 toward a lower direction in the top plan view, and a relatively wide end portion (not shown) for a connection with other layer or the external driving circuit. A gate driving circuit (not shown) generating the gate signal may be mounted on a flexible printed circuit film (not shown) attached onto the substrate 110, or may be directly mounted on the substrate 110 or may be integrated on the substrate 110.

Where the gate driving circuit is integrated on the substrate 110, the gate lines 121 may be extended so as to be directly connected to the gate driving circuit on the substrate 110.

The storage electrode lines 131 are applied with a predetermined voltage. Each of the storage electrode lines 131 includes a stem line which extends to be elongated in parallel with the gate lines 121, and a plurality of pairs of first and second storage electrodes 133a and 133b which are branched from the stem line. Each of the storage electrode lines 131 is disposed between two neighboring gate lines 121, and of which the stem line is disposed closer to a lower gate line 121 of the two neighboring gate lines 121 in the top plan view. The elongated storage electrodes 133a and 133b have a fixed first end connected to the stem line and a free (e.g., distal) second end which is opposite to the fixed end thereof. The first storage electrode 133a has the fixed end having a relatively wide planar area. The free end of the first storage electrode 133a is branched into two portions from a main portion thereof, the branched portions including a straight line (e.g., linear) portion and a curved portion. However, the shape and the arrangement of the storage electrode line 131 may be variously modified.

The gate lines 121 and storage electrode lines 131 may include or be made of an aluminum (Al) based metal such as aluminum, an aluminum alloy, or the like, a silver (Ag) based metal such as silver, a silver alloy, or the like, a copper (Cu) based metal such as copper, a copper alloy, or the like, a molybdenum (Mo) based metal such as molybdenum, a molybdenum alloy, or the like, chromium (Cr), tantalum (Ta), and titanium (Ti), and the like. The gate lines 121 and the storage electrode lines 131 may have a single layer structure, or a multilayer structure including two conductive layers (not shown) having different physical properties. In the multilayer structure, one conductive layer among the two conductive layers includes or is made of a metal having a low resistivity, for example, an aluminum based metal, a silver based metal, a copper based metal, or the like, in order to reduce a signal delay or a voltage drop. In contrast, the other conductive layer in the multilayers structure includes or is made of another material, for example, a material having excellent physical, chemical and electrical contact characteristics with respect to indium tin oxide ("ITO") and indium zinc oxide ("IZO"). The other conductive layer may include or is made of, for example, a molybdenum based metal, chromium, tantalum, titanium, or the like. Examples of the above-mentioned combination may include a chromium lower layer and an aluminum (alloy) upper layer, and an aluminum (alloy) lower layer and a molybdenum (alloy) upper layer. However, the gate lines 121 and storage electrode lines 131 may be made of various metals or conductors, in addition to those described above.

In a cross-sectional view, sides or edges of the gate lines 121 and the storage electrode lines 131 are inclined with respect to a surface of the substrate 110. The inclined sides or edges of the gate lines 121 and the storage electrode lines 131 may form an inclined angle of about 30 degrees (°) to about 80° with the surface of the substrate 110.

A gate insulating layer 140 including or made of silicon nitride (SiNx) or silicon oxide (SiOx) is disposed on the gate lines 121 and the storage electrode lines 131.

A plurality of linear semiconductors 151 including or made of hydrogenated amorphous silicon (for short, "a-Si"), polysilicon or the like is disposed on the gate insulating layer 140. The linear semiconductors 151 are mainly extended to be elongated in the vertical direction in the top plan view. The linear semiconductors 151 include a plurality of projections 154 which are protruded from a main portion thereof toward the gate electrodes 124.

A plurality of linear ohmic contacts (not shown) and island-shape ohmic contacts 165 are disposed on the linear semiconductors 151. The ohmic contacts may include or be made of a material such as n+ hydrogenated amorphous silicon which is relatively heavily doped with n-type impurities such as phosphorus (P), and the like, or may include or be made of silicide. The linear ohmic contacts (not shown) have protruded from a main portion thereof a plurality of projections 163. The projections 163 and the island-shape ohmic contacts 165 are disposed on the projections 154 of the linear semiconductors 151 in pairs.

In a cross-sectional view, sides or edges of the linear semiconductors 151 and the ohmic contacts are also inclined with respect to the substrate 110, and may form an inclined angle of about 30° to about 80° with the surface of the substrate 110.

A plurality of data lines 171 and a plurality of drain electrodes 175 are disposed on the ohmic contacts and the gate insulating layer 140.

The data lines 171 transfer a data signal and are mainly extended to be elongated in the vertical direction of the top plan view so as to intersect with the gate lines 121. Each of the data lines 171 also intersects with the storage electrode lines 131 and is elongated between the first storage electrode 133a and the second storage electrode 133b which are adjacent to each other. Each of the data line 171 includes a plurality of source electrode 173 which are protruded from and main portion thereof and extended toward the gate electrodes 124, and a relatively wide end portion (not shown) for a connection with other layer or an external driving circuit.

A data driving circuit (not shown) generating the data signal may be mounted on a flexible printed circuit film (not shown) attached onto the substrate 110, or may be directly mounted on the substrate 110 or may be integrated on the substrate 110. Where the data driving circuit is integrated on the substrate 110, the data line 171 may be extended so as to be directly connected to the data driving circuit on the substrate 110.

In the top plan view, the drain electrodes 175 are separated from the data lines 171 and face the source electrodes 173 while having the gate electrodes 124 at the center therebetween.

One gate electrode 124, one source electrode 173 and one drain electrode 175 constitute one thin film transistor ("TFT") together with the projection 154 of the semiconductor. A channel of the TFT is formed at or by the projection 154 of the semiconductor between the source electrode 173 and the drain electrode 175. A portion of the projection 154 of the semiconductor is exposed between the source electrode 173 and the drain electrode 175.

The data lines 171 and the drain electrodes 175 may include or be made of a refractory metal such as molybdenum, chromium, tantalum and titanium and the like, or an alloy thereof. The data lines 171 and the drain electrodes 175 may have a single layer structure, or a multilayer structure including a refractory metal layer (not shown) and a low resistance conductive layer (not shown). Examples of the multilayer structure may include a double layer of a chromium or molybdenum (alloy) lower layer and an aluminum (alloy) upper layer, and a triple layer of molybdenum (alloy) lower layer, an aluminum (alloy) middle layer, and a molybdenum (alloy) upper layer. However, the data lines 171 and the drain electrodes 175 may include or be made of various metals or conductors, in addition to those described above.

In a cross-sectional view, sides or edges of the data line 171 and the drain electrode 175 may be inclined with respect to the surface of the substrate 110, and may form an inclined angle of about 30° to about 80° with the surface of the substrate 110.

Color filters 230R, 230G and 230B are disposed on the data line 171, the drain electrode 175 and exposed portions of the semiconductor 151.

Each of the color filters 230R, 230G and 230B displays one of primary colors such as the three primary colors of red, green and blue. However, the colors that the color filters 230R, 230G and 230B may display are not limited to red, green and blue. The color filters 230R, 230G and 230B may also display cyan, magenta, yellow and white.

The color filters 230R, 230G and 230B are provided with a plurality of contact holes 185 defined therein and exposing the drain electrodes 175. The color filters 230R, 230G, and 230B and the gate insulating layer 140 are provided with a plurality of contact holes 183a defined therein and exposing a portion of the storage electrode lines 131 near the fixed end of the first storage electrodes 133a and a plurality of contact holes 183b exposing the projection of the free end of the first storage electrodes 133a.

A plurality of pixel electrodes 191 and a plurality of overpasses 196 are disposed on the color filters 230R, 230G and 230B. The pixel electrodes 191 and the overpasses 196 may include or be made of a transparent conductive material such as an ITO, an IZO or the like, or a reflective metal such as aluminum, silver, chromium or an alloy thereof. The pixel electrodes 191 are physically and electrically connected to the drain electrodes 175 through the contact holes 185 and are applied with a data voltage from the drain electrodes 175. The pixel electrodes 191 to which the data voltage is applied generate an electric field in collaboration with a common electrode 270 of the common electrode display panel 200 which is applied with a common voltage, thereby determining an arrangement of the liquid crystal material in the liquid crystal layer 3 between two electrodes 191 and 270. Polarization of light passing through the liquid crystal layer 3 is changed depending on the arrangement of the liquid crystal material, determined as described above. Each of the pixel electrodes 191 and the common electrode 270 forms a capacitor (hereinafter, referred to as "liquid crystal capacitor"), so as to maintain the applied data voltage even after the TFT is turned off.

The pixel electrodes 191 are overlapped with the storage lines 131 including the storage electrodes 133a and 133b. Capacitors formed by overlapping of the storage electrode lines 131 and the pixel electrodes 191 and overlapping of the storage electrode lines 131 and the drain electrodes 175 which are electrically connected to the pixel electrodes 191 are referred to as storage capacitors, which enhance voltage storage capability of the liquid crystal capacitor.

The overpasses 196 are elongated to intersect the gate lines 121. The overpasses 196 are each connected to an exposed portion of the storage electrode lines 131 and to an exposed end portion of the free end of the first storage electrodes 133a through the contact holes 183a and 183b which are respectively disposed at opposing ends of the overpasses 196 with respect to the gate lines 121. The storage electrode lines 131 including the storage electrodes 133a and 133b may be used to repair a defect of the gate lines 121, the data lines 171 and/or the TFTs together with the overpasses 196.

The pixel electrodes 191 may be arranged in columns and rows within the display region A of the LCD. The color filters 230R, 230G and 230B may each be extended to be elongated in a column direction of the pixel electrodes 191. The color filters 230R, 230G and 230B may have a flat top surface in the cross-sectional view.

In the display area, a light blocking member 220, which is also referred to as a black matrix, is disposed on the color filters 230R, 230G, and 230B and the pixel electrodes 191. The light blocking member 220 includes a plurality of opening parts defined therein to have approximately the same shape as the pixel electrodes 191. The light blocking member 220 reduces or effectively prevents light leakage between adjacent pixel electrodes 191 in the display region A. The light blocking member 220 includes portions corresponding to the gate lines 121 and the data lines 171, and portions corresponding to the TFTs. The light blocking member 220 may include or be formed of a photosensitive material having a property in that the portion thereof exposed to an exposure light remains and the remaining portion is removed such as by development.

An alignment layer 11 is disposed on the pixel electrodes 191 and the light blocking member 220. The alignment layer 11 may be disposed within the display region A, and may include or be made of an insulating material such as polyimide.

Next, the non-display region B of the thin film display panel 100 will be described. First, referring to FIG. 2, an exemplary embodiment of the thin film display panel 100 according to the invention further includes a dummy color filter disposed between the non-display region B and a cell array of the display region A.

The non-display region B includes a first region b adjacent to the display region A and a second region b' adjacent to a sealant 310 and further from the display region A than the first region b. The non-display region B and the first and second regions b and b' each have a length in an elongation direction thereof and a width taken perpendicular to the length. Referring to FIGS. 3 and 4, widths of the non-display region B and the first and second regions b and b' are taken in horizontal directions of the top plan and cross-sectional views.

A plurality of step providing layers 231 which is disposed on the insulating substrate 110 and spaced apart from each other is arranged in a region defined by the sealant 310 along the non-display region B. Referring to FIG. 3, three elongated lines of step providing layers 231 which are spaced apart from each other are disposed in the region defined by the sealant 310 along the non-display region B. Although the lines of the step providing layers 231 are illustrated in the shape of a continuous line, the lines of the step providing layers 231 may have a shape of a discontinuous line with regularly spaced intervals in an elongation direction thereof. The step providing layers 231 may include or be made of a same material as the color filters 230R, 230G and 230B in the display region A, for instance the material of the blue color filter 230B which has a relatively low light transmittance.

A first step providing layer 231a is disposed in the first region b, and two second step providing layers 231b which are spaced apart from each other and the first step providing layer 231a are disposed in the second region b'.

The light blocking member 220 is disposed on the step providing layers 231 in the non-display region B. The light blocking member 220 is elongated to be disposed in the region defined by the sealant 310 along the non-display region B, and covers the step providing layers 231.

In detail, the light blocking member 220 includes a first light blocking member 220a disposed in the first region b and a second light blocking member 220b disposed in the second region b'. In an exemplary embodiment of manufacturing the LCD, the first light blocking member 220a disposed in the first region b is formed by using a half-tone mask which partially transmits the exposure light, and the second light blocking member 220b disposed in the second region b' is formed by using a full-tone mask which fully transmits the exposure light. Through this, since the first region b closest to the display region A is formed by using a half-tone mask which transmits less exposure light than that of the full-tone mask used in forming the second region b' further from the display region A, over-development of the light blocking member 220 in the non-display region B may be reduced or effectively prevented and uniformity of the development of the light blocking member 220 in the non-display region B and the display region A may be promoted by controlling pattern density of the mask.

The width of the first region b may occupy at least about 16% of a total width of the non-display region B. If the width of the first region b which is exposed through the half-tone mask is less than 16%, a height of the first light blocking member 220a formed in the first region b may not be sufficiently lower than the height of the second light blocking member 220b formed in the second region b', thereby causing defects of an inflated cell gap in the display region A.

The width of the first region b may be about 800 micrometers (um).

Also, in an exemplary embodiment of manufacturing the LCD, by increasing the height of the underlying step providing layers 231 the light blocking member 220 disposed in the non-display region B may suppress the flowability of liquid crystal material 300 and effectively function as a dam to reduce or effectively prevent the liquid crystal material 300 from overflowing the display region A.

The height of the first light blocking member 220a disposed in the first region b is different from the height of the second light blocking member 220b disposed in the second region b'. The heights of the light blocking member 220 in the non-display region B are taken from a common reference such as the surface of the substrate 110. The heights may also be defined by a maximum distance from the common reference or by an uppermost surface of the light blocking member 220. In detail, the height of the first light blocking member 220a disposed in the first region b, which is formed by using the half-tone mask is lower than the height of the second light blocking member 220b disposed in the second region b', which is formed by using the full-tone mask. The height difference between the first light blocking member 220a disposed in the first region b and the second light blocking member 220b disposed in the second region b' may be about 0.5 um or more. If the height difference between the first light blocking member 220a and the second light blocking member 220b is less than 0.5 um, the cell gap between the common electrode display panel 200 and the thin film transistor display panel 100 may not be suitable, thereby causing light leakage spots.

The common electrode display panel 200 which faces the thin film transistor display panel 100 will be described.

The common electrode 270 including or made of a transparent conductor such as ITO or IZO is disposed on a substrate 210 including or made of an insulating material such as a transparent glass, plastic or the like. An alignment layer 21 is disposed on the common electrode 270. The alignment layer 21 may be disposed within the display region A and may include or be made of an insulating material such as polyimide.

The two display panels 100 and 200 which face each other are bonded to be fixed relative to each other by the sealant 310. The sealant 310 is disposed around the circumference of the display region A and defines a predetermined shape of a closed region. The sealant 310 may have the same height as the cell gap and may include or be made from a photo-curable resin or a thermosetting resin such as an acrylic based resin, an epoxy based resin, an acrylic-epoxy based resin and a phenol resin.

In an exemplary embodiment of manufacturing the LCD, the liquid crystal material 300 is filled in the region defined by the sealant 310. The region defined by the sealant 310 may include the display region A and the non-display region B. The step providing layers 231 adjust speed of the liquid crystal material 300 flowing out from the display region A toward the non-display region B. Therefore, since the step providing layers 231 adjust the flow speed of the liquid crystal material 300, concentration of the liquid crystal material 300 on edges of the display panels 100 and 200 is reduced or effectively prevented to maintain the cell gap uniformly. In addition, since the step providing layers 231 suppress flowability of the liquid crystal material 300, curling of the liquid crystal material 300 into the display region A may be reduced or effectively prevented.

In addition, in an exemplary embodiment of manufacturing the LCD, the sealant 310 may be cured by light or heat after the display panels 100 and 200 are assembled with each other. Where the sealant 310 is cured after the display panels 100 and 200 are assembled with each other, the step providing layers 231 reduce or effectively prevent the liquid crystal material 300 from contacting the sealant 310 in a non-cured state, thereby preventing the liquid crystal material 300 from being contaminated from the sealant 310 in the non-cured state.

Polarizers (not shown) are provided on outer surfaces of the display panels 100 and 200. Polarizing axes of the two polarizers are in parallel with each other or are perpendicular to each other. In a reflective LCD, one of the two polarizers may be omitted.

The liquid crystal layer 3 may have positive or negative dielectric anisotropy, and the liquid crystals 300 of the liquid crystal layer 3 are aligned so that major axes thereof are approximately in parallel with or are approximately perpendicular to surfaces of the two display panels 100 and 200 in the absence of an electric field.

Figure 5:
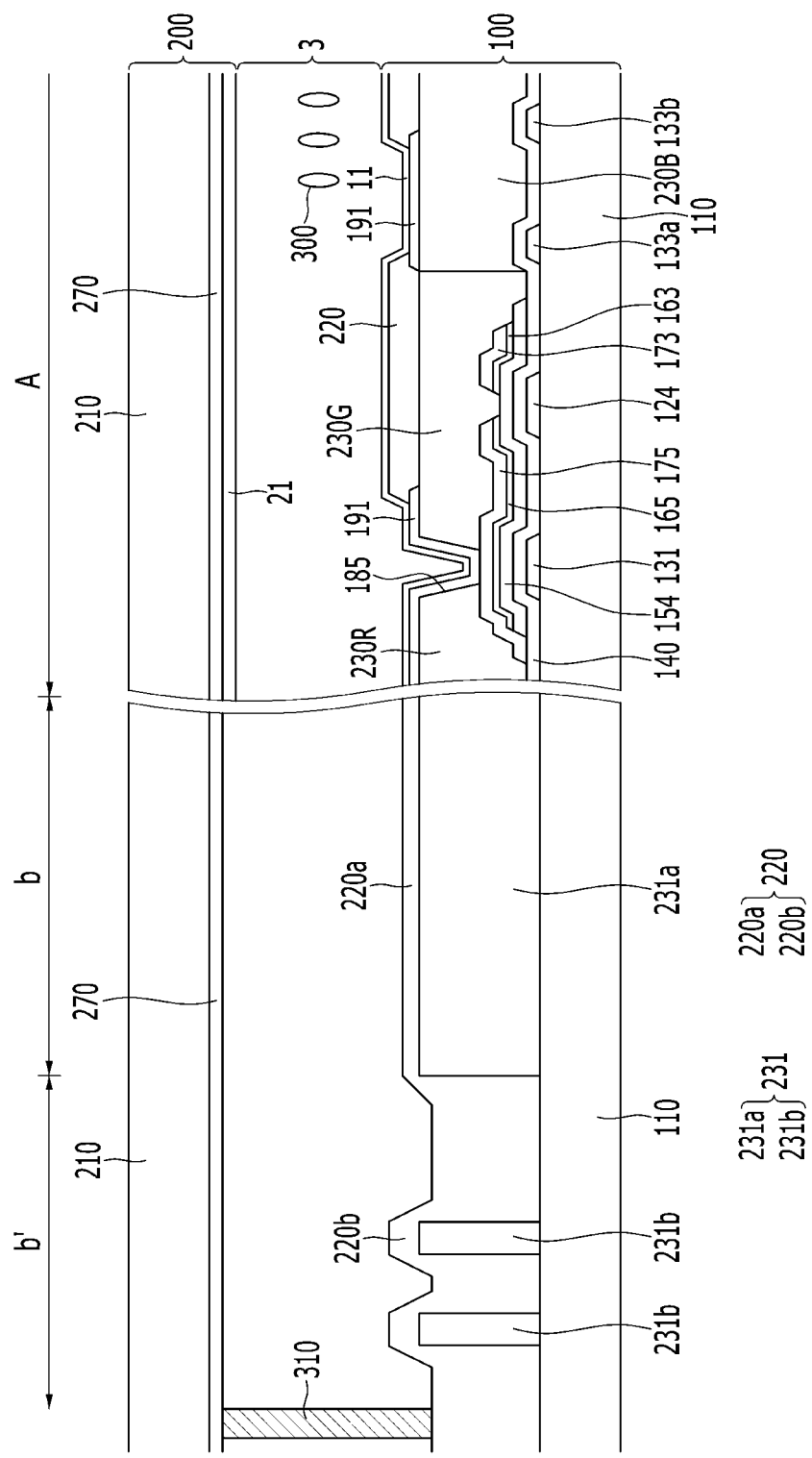
FIG. 5 is a cross-sectional view of a modified exemplary embodiment of a liquid crystal display according to the invention.
Figure 6:
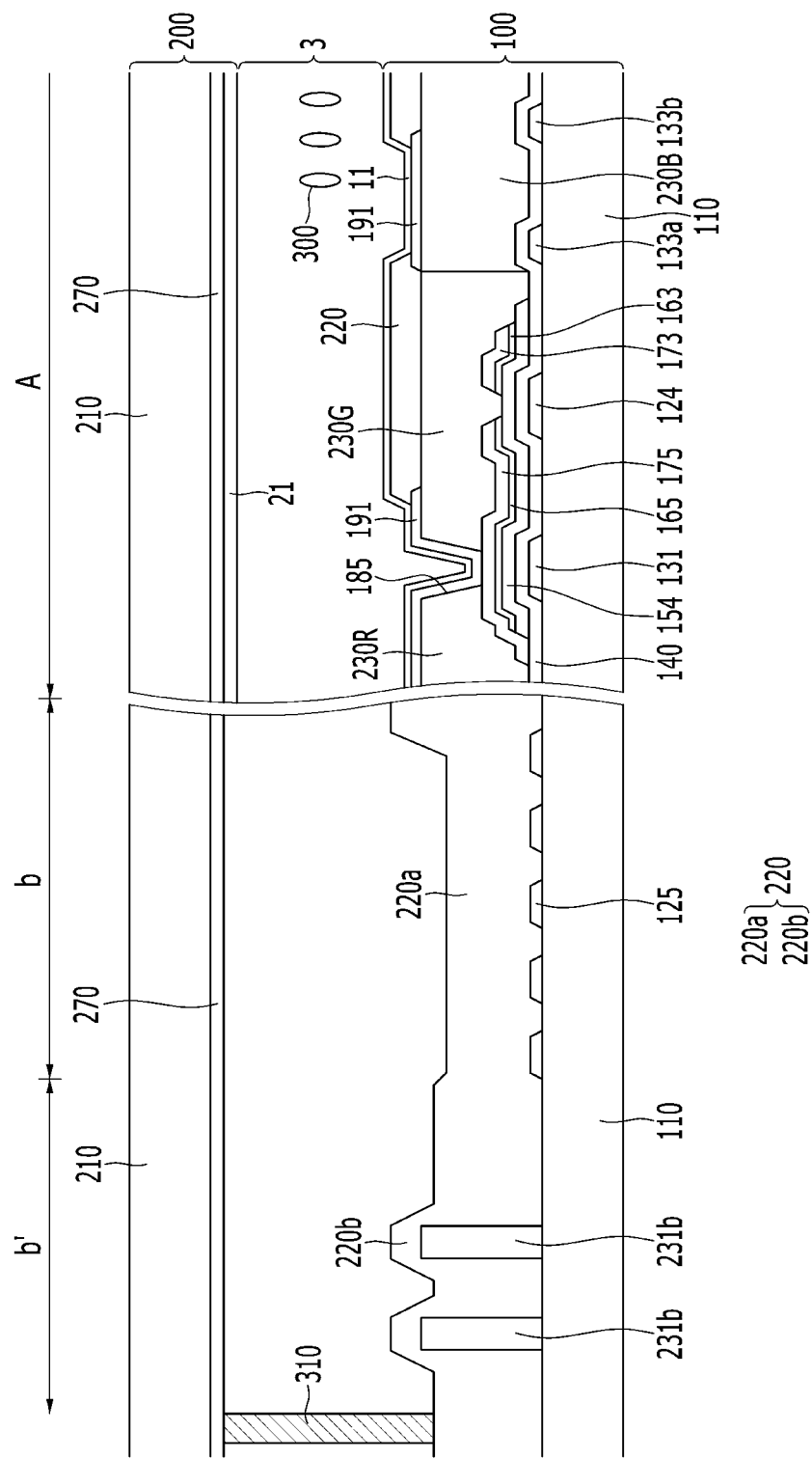
FIG. 6 is a cross-sectional view of another modified exemplary embodiment of a liquid crystal display according to the invention.
Figure 7:
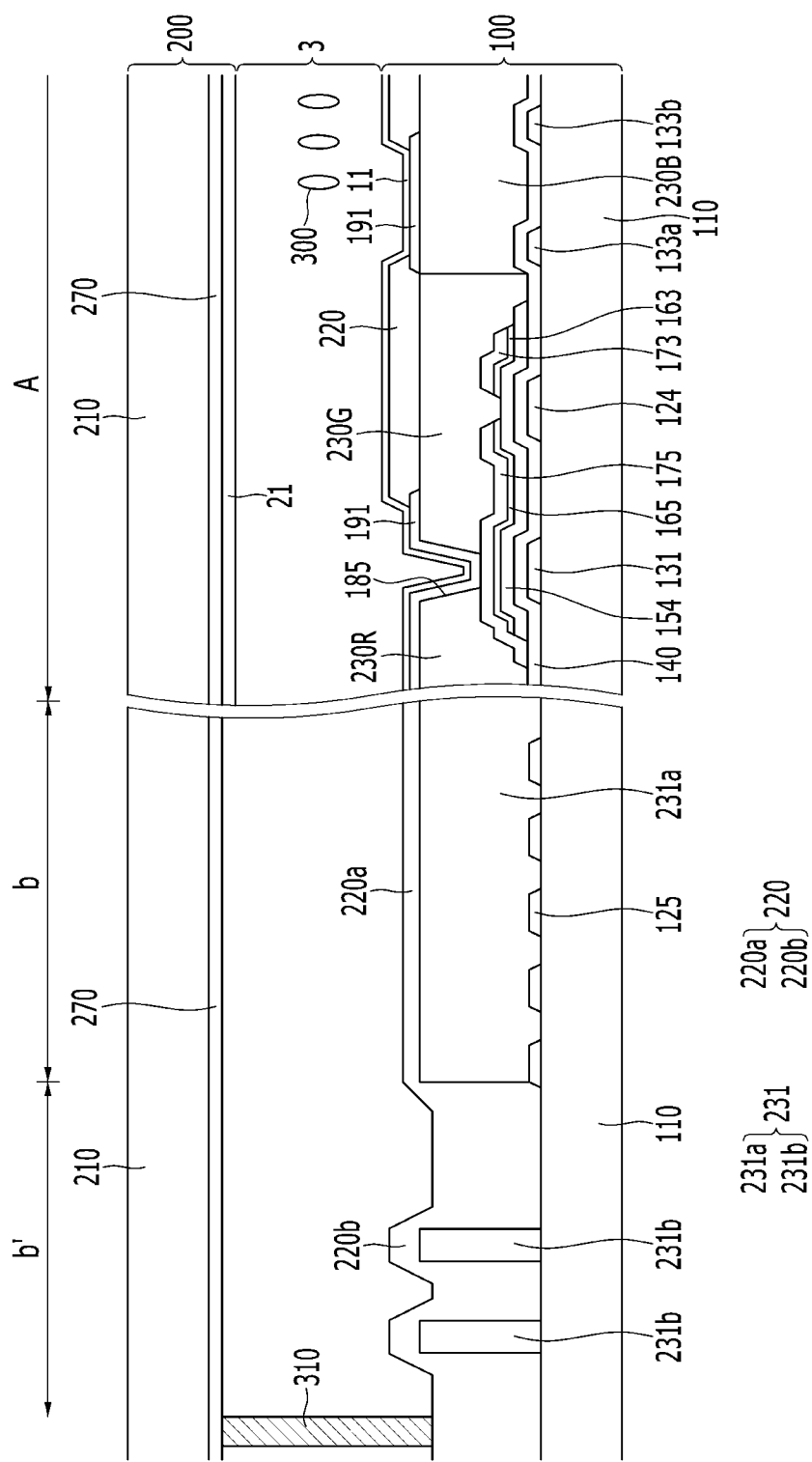
FIG. 7 is a cross-sectional view of still another modified exemplary embodiment of a liquid crystal display according to the invention.
Figure 8:
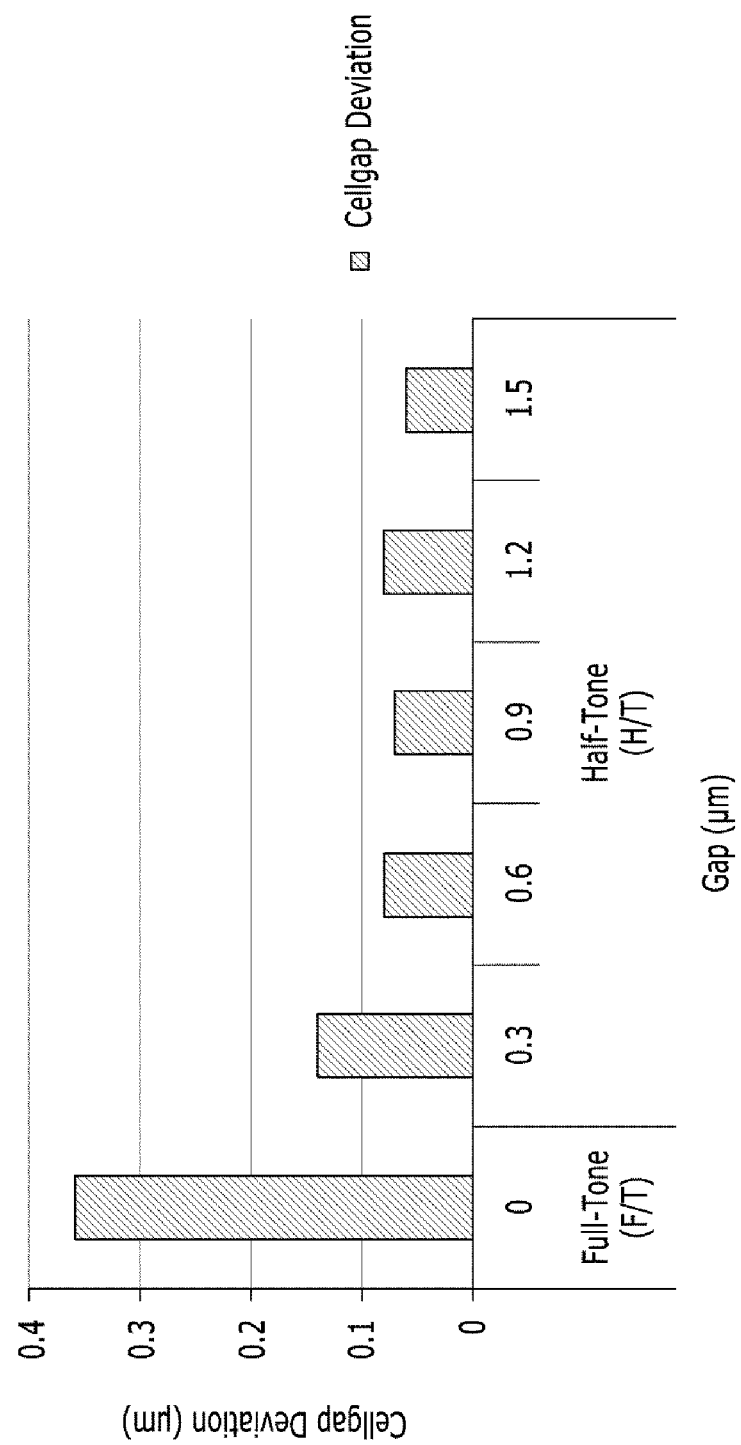
FIG. 8 is a graph showing cell gap deviation at boundary region of an exemplary embodiment of a liquid crystal display according to the invention.

Hereinafter, modified exemplary embodiments of a LCD according to the invention will be described in detail with reference to FIG. 5 to FIG. 8. FIG. 5 to FIG. 7 are cross-sectional views of modified exemplary embodiments of a LCD according to the invention, and FIG. 8 is a graph showing cell gap deviations with respect to a gap in a boundary region of exemplary embodiment of a LCD according to the invention.

First, FIG. 5 is a cross-sectional view of a modified exemplary embodiment of a LCD according to the invention.

The same configuration and structure as those in the exemplary embodiment described above will be omitted and the non-display region B of the thin film transistor display panel 100 of FIG. 5 will be described.

Unlike an exemplary embodiment of FIG. 4, a first step providing layer 231a is widely disposed on the substrate 110 including or made of an insulating material such as a transparent glass, plastic or the like, along the first region b. The first step providing layer 231a may be disposed along substantially an entire width of the first region b as shown in FIG. 5.

The second step providing layers 231b disposed in the second region b' are spaced apart from each other with a predetermined interval as described in the foregoing exemplary embodiment.

When the first region b adjacent to the display region A is expanded and where the first light blocking member 220a is formed in such expanded first region b by using the half-tone mask, the optical density of the light blocking member 220 may be deteriorated due to the lessened height of the light blocking member, thereby causing the light leakage around the boundary region of the pixels and at a non-display region at the circumference of a display region of the LCD. To solve this problem, in the exemplary embodiment of FIG. 5, the first step providing layer 231a having a relatively wide width in the first region b is formed of the same material as the blue color filter 230B which has a low light transmittance. Accordingly, the first step providing layer 231a having a relatively wide width may compensate the deficient optical density of the light blocking member 220 in the first region b.

Therefore, the step providing layers 231 may prevent light from a backlight (not shown) which is disposed below the thin film transistor display panel 100 from leaking at the non-display region B through the light blocking member 220.

The light blocking member 220 is disposed on the step providing layers 231 in the non-display region B. The light blocking member 220 may be also disposed within the region defined by the sealant 310 along the non-display region B and covers the step providing layers 231. The light blocking member 220 includes the first light blocking member 220a disposed in the first region b and the second light blocking member 220b disposed in the second region b'. In an exemplary embodiment of manufacturing the LCD, the first light blocking member 220a disposed in the first region b is formed by using a half-tone mask which partially transmits the exposure light, and the second light blocking member 220b disposed in the second region b' is formed by using a full-tone mask which fully transmits the exposure light.

FIG. 6 is a cross-sectional view of another modified exemplary embodiment of a LCD according to the invention.

Referring to FIG. 6, the non-display region B of the thin film transistor display panel 100 will be described.

In the first region b which is a portion of the overall non-display region B directly adjacent to the display region A, a light leakage preventing layer 125 is disposed along the first region b instead of the first step providing layer 231a. The leakage preventing layer 125 includes a plurality of metal patterns between which are defined slits. The leakage preventing layer 125 compensates the optical density of the first region b in which the first light blocking member 220a is formed by using the half-tone mask. The interval between adjacent metal patterns may be about 5 um or less. If the interval between adjacent metal patterns is greater than 5 um, recognition of light leakage may be increased.

The second step providing layers 231b disposed in the second region b' are spaced apart from each other with a predetermined interval as described in the foregoing exemplary embodiment.

Referring to FIG. 7 as still another modified exemplary embodiment according to the invention, the first region b may include therein both the first step providing layer 231a which is relatively widely disposed along the first region b and the light leakage preventing layer 125. Since the first step providing layer 231a including or made of the same material as the blue color filter 230B which has a low light transmittance is widely disposed along the first region b, and since the light leakage preventing layer 125 is further provided below the first step providing layer 231a in the first region b, the light leakage which may occur in the first region b in which the first light blocking member 220a is formed by using the half-tone mask, is completely blocked. In an exemplary embodiment, the light leakage preventing layer 125 according to the invention may be a metal slit pattern. The interval between adjacent metal slit patterns may be about 5 um or less.

The second step providing layers 231b disposed in the second region b' are spaced apart from each other with a predetermined interval as described in the foregoing exemplary embodiment.

Referring to FIG. 4 to FIG. 7, an exemplary embodiment of a manufacturing method of a LCD according to the invention will be described. The gate lines 121 including the gate electrodes 124, and the storage electrode lines 131 including the storage electrodes 133a and 133b, are formed on the substrate 110. The gate lines 121 and the storage electrode lines 131 are formed from a conductive material such as an aluminum alloy.

As shown in FIG. 6 and FIG. 7, the light leakage preventing layer 125 of which patterns are arranged in a direction parallel to the gate lines 121 may be further formed on the substrate 110. The light leakage preventing layer 125 may include a plurality of elongated metal patterns between which slits are defined. The light leakage preventing layer 125 is configured to compensate the optical density of the first region b in which the first light blocking member 220a is formed by using the half-tone mask. The metal slit pattern may include or be formed of the same material as the gate line 121. The interval between adjacent metal patterns may be about 5 um or less.

The gate insulating layer 140, an intrinsic amorphous silicon layer and an n+ hydrogenated amorphous silicon layer are deposited such as by plasma enhanced chemical vapor deposition ("PECVD") and the n+ hydrogenated amorphous silicon layer and the amorphous silicon layer are photo-etched, thereby forming a pre-pattern of the ohmic contacts 163 and 165 and the linear semiconductors 151 including the projections 154.

The source electrode 173, the data line 171, and the drain electrode 175 are formed with a conductive material such as aluminum alloy.

The ohmic contacts 163 and 165 are completed by removing a portion of the pre-pattern of the ohmic contacts 163 and 165, which is exposed between the source electrode 173 and the drain electrode 175, and a portion of the projection 154 of the semiconductor below the ohmic contacts 163 and 165 is exposed.

The color filters 230R, 230G and 230B in which the contact holes 183a, 183b and 185 are defined, and the step providing layers 231, are formed on the substrate 110 such as by photolithography. The gate insulating layer 140 exposed through the contact holes 183a and 183b defined in the color filters 230R, 230G and 230B is etched to respectively expose the storage electrode lines 131 and to expose the projection of the free end of the first storage electrodes 133a. The pixel electrodes 191 and the overpasses 196 are formed on the color filters 230R, 230G and 230B.

A light blocking member material is formed to cover the non-display region B including the step providing layers 231 and the display region A including the color filters 230R, 230G, and 230B and the pixel electrodes 191. The light blocking member 220 may be formed of a photosensitive material having a property in that a portion thereof exposed to an exposure light remains and another portion thereof is removed by development.

The light blocking member 220 is formed by exposing the light blocking member material to light through a mask having three pattern types.

The mask includes a full-tone pattern that transmits 100% of the exposure light, a half-tone pattern that transmits 20% of the exposure light, and a blocking pattern that completely blocks the exposure light. The blocking pattern of the mask is disposed on the pixel electrode 191, the half-tone pattern of the mask is disposed on the first region b of the non-display region B, and the full-tone pattern of the mask is disposed on a boundary portion where light transmission must be blocked such as between the pixel electrodes 191 and in the second region b' of the non-display region B. The light blocking member material is removed except for portions exposed to the exposure light, thereby having a plurality of openings which are spaced apart from each other as shown in FIG. 4.

The width of the first region b in which the first light blocking member 220a is formed by using the half-tone mask occupies at least 16% of the total width of the non-display region B. If the area of the first region b which is exposed through the half-tone mask is less than 16%, the height of the first light blocking member 220a formed from the light blocking material in the first region b may not be sufficiently lower than the height of the light blocking member 220b formed from the light blocking material in the second region b', thereby causing defects of inflated cell gap. The width of the first region b may be about 800 um.

Also, the height of the first light blocking member 220a disposed in the first region b, which is formed from the light blocking material by using the half-tone mask, is lower than the height of the second light blocking member 220b disposed in the second region b', which is formed from the light blocking material by using the full-tone mask, by about 0.5 um or more.

The alignment layer 11 is coated on the pixel electrodes 191 and the light blocking member 220 in the display region A to complete the thin film transistor display panel 100.

The common electrode 270 is formed on the substrate 210 with a transparent conductive layer such as ITO or IZO and the alignment layer 21 is coated onto the common electrode 270. The sealant 310 is formed to complete the common electrode display panel 200 which will be disposed facing the thin film transistor display panel 100. The height of the sealant 310 may be formed to be equal to or higher than the cell gap in consideration of a pressure applied on the sealant 310 during assembly of the display panels 100 and 200.

The LCD is completed by dropping the liquid crystal material 300 on the common electrode display panel 200 and assembling the thin film transistor display panel 100 and the common electrode display panel 200 to each other.

While the manufacturing method of the invention has been described in connection with the exemplary embodiments according to FIG. 4 to FIG. 7, it is to be understood that the manufacturing method of the invention is not limited to the disclosed exemplary embodiments.

FIG. 8 is a graph showing cell gap deviations with respect to a gap in a boundary region of exemplary embodiment of a LCD according to the invention. As noted above, a thickness of the liquid crystal layer in the display region of the LCD and between two display panels of an LCD is referred to as a cell gap.

Referring to FIG. 8, within the non-display region B as a boundary region of the LCD, the light blocking member may be formed by using Full-Tone (F/T) and Half-Tone (H/T) portions of a mask. In the non-display region B, a Gap may be defined between the light blocking member and the common electrode display panel 200. When the gap between the light blocking member and the common electrode display panel 200 in the boundary region is equal to or more than 0.6 um, the deviation of the cell gap in the display area of the LCD is less than 0.1 um. Therefore the likelihood of recognizing the light leakage is reduced or effectively prevented.

Another exemplary embodiment of a LCD according to the invention and a manufacturing method thereof will be described with reference to FIG. 9. The same configuration and structure as those in the exemplary embodiment described above are omitted and the non-display region B and its manufacturing method will be described.

Figure 9:
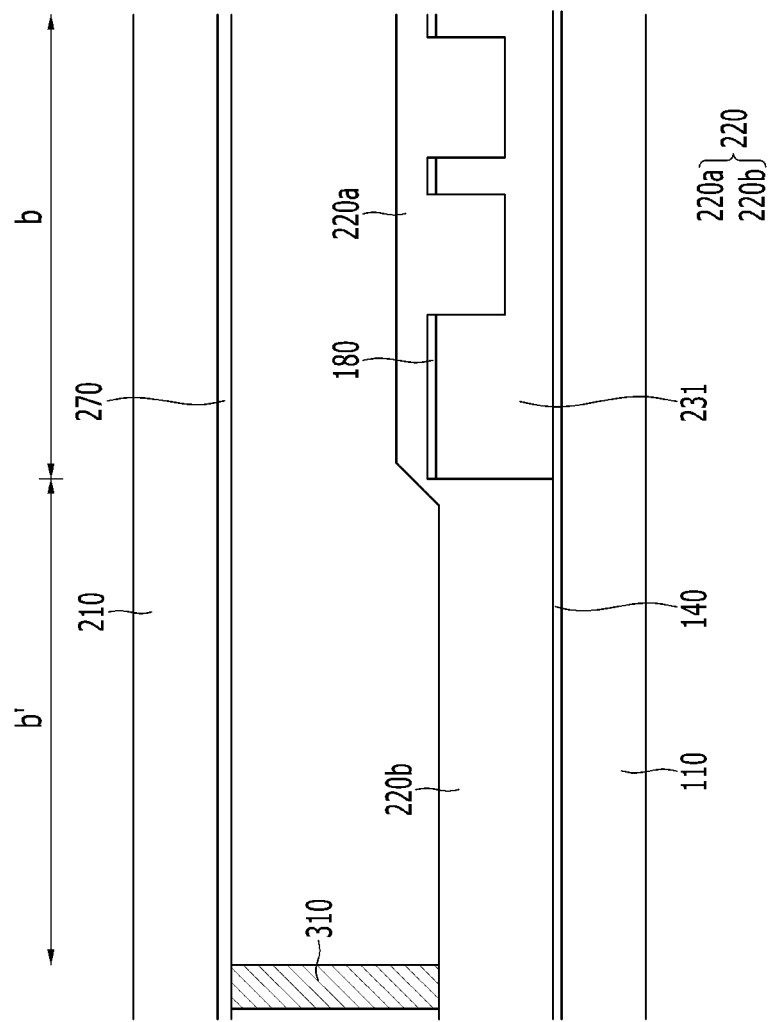
FIG. 9 is a cross-sectional view of another exemplary embodiment of a liquid crystal display according to the invention.

FIG. 9 is a cross-sectional view of another exemplary embodiment of the LCD according to the invention.

The same configuration and structure as those in the exemplary embodiment described above are omitted and the non-display region B of the thin film transistor display panel 100 of FIG. 9 and the manufacturing method thereof will be described.

The step providing layer 231 is relatively widely disposed on the substrate 110 including or made of an insulating material such as a transparent glass, plastic or the like, along the first region b. However, unlike the foregoing exemplary embodiments of the invention, the second region b' in which a light blocking member 220 is formed using the full-tone mask does not include (e.g., excludes) the step providing layer 231.

Referring to FIG. 9, the step providing layer 231 is relatively widely disposed along the first region b, such as to occupy substantially an entirety of the width of the first region b. The step providing layer 231 may include or be made of the same material as the blue color filter 230B. The step providing layer 231 disposed in the first region b and formed from the same material as the blue color filter 230B has protrusions and depressions.

The first light blocking member 220a and the second light blocking member 220b are disposed on the non-display region B respectively including the first region b in which the step providing layer 231a is disposed and the second region b' in which the step providing layer is absent.

In an exemplary embodiment of manufacturing a LCD, the first light blocking member 220a in the first region b is formed from a light blocking material by using the half-tone mask which partially transmits the exposure light, and the second light blocking member 220b in the second region b' is formed from the light blocking material by using the full-tone mask which fully transmits the exposure light. The first light blocking member 220a is disposed on the step providing layers 231 which has protrusions and depressions to suppress the flowability of the liquid crystal material 300. By increasing the height of the step providing layer 231a, the first light blocking member 220a may be formed to essentially function as a dam to reduce or effectively prevent the liquid crystal material 300 from overflowing.

Referring to FIG. 9, an exemplary embodiment of a manufacturing method of a LCD according to the invention will be described. The gate insulating layer 140 is deposited on the substrate 110 such as by PECVD.

The step providing layer 231 formed on the gate insulating layer 140 is formed only in the first region b among regions of the non-display region B. The step providing layer 231 is relatively widely formed along the first region b. The step providing layer 231 may include or be made of the same material as that of the blue color filter 230B. The step providing layer 231 may be a single, unitary member in the first region b.

After a capping layer 180 is formed on the step providing layer 231, the step providing layer 231 is dry-etched to form protrusions and depressions of the single, unitary step providing layer 231. The protrusions between the depressions may define a plurality of step providing layers spaced apart from each other.

A light blocking member material is formed to cover the non-display region B including the first region b having the step providing layer 231 and the second region b' excluding the step providing layer 231. The light blocking member material may be a photosensitive material having a property in that a portion thereof exposed to an exposure light remains and another portion is removed such as by development.

The light blocking member 220 in the non-display region B is formed by exposing the light blocking material to the exposure light through a mask having two pattern types. The mask includes a full-tone pattern that transmits 100% of the exposure light and a half-tone pattern that transmits 20% of the exposure light.

The first region b of the non-display region B is exposed through the half-tone pattern, and the second region b' of the non-display region B is exposed through the full-tone pattern.

The half-tone pattern may be further divided. In an exemplary embodiment, for example, the display region A and a portion of the first region b of the non-display region B directly adjacent to the display region A, and the portion of the dummy color filter in the display region A may each be exposed through a half-tone pattern that transmits 16% of the exposure light, and the remaining (outermost) portion of the first region b further from the display region A may be exposed through a half-tone pattern that transmits 19% of the exposure light. The second region b' which is the outermost portion of the non-display region B is exposed through the full-tone pattern.

The first light blocking member 220a formed from the light blocking material on the step providing layer 231 of the non-display region B suppresses the flowability of the liquid crystal material 300. By increasing the height of the step providing layer 231, the first light blocking member 220a may be formed to essentially function as a dam to reduce or effectively prevent the liquid crystal material 300 from overflowing. As shown in FIG. 9, the top surface of the second light blocking member 220b formed from the light blocking material in the second region b' of the non-display region B excluding the step providing layer, may be lower than the top surface of the first light blocking member 220a formed from the light blocking material in the first region b of the non-display region B.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
a substrate comprising a display region and a non-display region, the non-display region comprising a first region adjacent to the display region and a second region further from the display region than the first region;
a light blocking member disposed in the non-display region of the substrate; and
a plurality of step providing layers disposed between the substrate and the light blocking member in the non-display region of the substrate, the step providing layers spaced apart from each other,
wherein a height of the light blocking member disposed in the first region of the non-display region is different from a height of the light blocking member disposed in the second region of the non-display region.

2. The liquid crystal display of claim 1,
wherein the height of the light blocking member disposed in the first region is smaller than the height of the light blocking member disposed in the second region by about 0.5 micrometer or more.

3. The liquid crystal display of claim 1,
wherein a width of the first region is equal to or greater than about 16% of a total width of the non-display region.

4. The liquid crystal display of claim 1,
wherein a width of the first region taken from the display region is about 800 micrometers.

5. The liquid crystal display of claim 1,
further comprising a color filter disposed in the display region of the substrate,
wherein the step providing layers disposed in the non-display region include a same material as the color filter disposed in the display region.

6. The liquid crystal display of claim 5,
wherein
the color filter disposed in the display region of the substrate comprises a blue color filter, and
the step providing layers disposed in the non-display region comprise a same material as the blue color filter.

7. The liquid crystal display of claim 6,
wherein the step providing layers disposed in the non-display region comprise a first step providing layer disposed in the first region, and
the first step providing layer disposed in the first region is elongated in a length direction of the first region.

8. The liquid crystal display of claim 7,
wherein in a width direction of the first region, the first step providing layer comprises protrusions and depressions alternately arranged.

9. The liquid crystal display of claim 7,
further comprising a light leakage preventing layer between the first step providing layer disposed in the first region and the substrate,
wherein in a width direction of the first region, the light leakage preventing layer comprises a plurality of portions spaced apart from each other.

10. The liquid crystal display of claim 9,
wherein the light leakage preventing layer comprises a metal slit pattern.

11. The liquid crystal display of claim 10,
wherein in the width direction of the first region, an interval between adjacent patterns of the metal slit pattern is equal to or less than about 5 micrometers.

12. The liquid crystal display of claim 5,
further comprising a gate insulating layer disposed in the non-display region of the substrate,
wherein
the step providing layers spaced apart from each other in the first region are defined by protrusions of a unitary step providing member in the first region of the substrate, and
the second region of the non-display region excludes the step providing layers.

* * * * *